United States Patent

Steinkuhl et al.

Patent Number: 5,287,955
Date of Patent: Feb. 22, 1994

[54] CONNECTIONS FOR INTER-CONNECTING THE PANS OF SCRAPER-CHAIN CONVEYORS

[75] Inventors: Bernd Steinkuhl; Detlef Hahn, both of Lunen, Fed. Rep. of Germany

[73] Assignee: Westfalia Becorit Industrietechnik, GmbH, Fed. Rep. of Germany

[21] Appl. No.: 929,277

[22] Filed: Aug. 13, 1992

[30] Foreign Application Priority Data

Aug. 28, 1991 [DE] Fed. Rep. of Germany ....... 4128512

[51] Int. Cl.$^5$ ............................................. B65G 19/28
[52] U.S. Cl. ............................... 198/735.6; 198/861.2
[58] Field of Search ............... 198/860.1, 861.2, 860.2, 198/735.6

[56] References Cited

U.S. PATENT DOCUMENTS

| | | | |
|---|---|---|---|
| 3,583,552 | 6/1971 | Renwick | 198/735.6 |
| 3,680,682 | 8/1972 | Paul | 198/735.6 X |
| 4,420,075 | 12/1983 | Skolik et al. | 198/860.2 X |
| 4,588,072 | 5/1986 | Braun et al. | 198/735.6 |
| 4,646,905 | 3/1987 | Grundken et al. | 198/735.6 |
| 4,733,771 | 3/1988 | Grundken et al. | 198/735.6 |
| 4,813,747 | 3/1989 | Klimeck et al. | 198/735.6 |

FOREIGN PATENT DOCUMENTS

| | | | |
|---|---|---|---|
| 2826578 | 1/1980 | Fed. Rep. of Germany | 198/735.6 |
| 0839896 | 6/1981 | U.S.S.R. | 198/735.6 |

Primary Examiner—James R. Bidwell
Attorney, Agent, or Firm—Samuels, Gauthier & Stevens

[57] ABSTRACT

The pans of a scraper-chain conveyor are interconnected with a dog-bone type connector which fits into laterally open shaped pockets in the side walls of the pans. A projection on one of the ends of the connector engages in a recess closed off from the side access while a projection at the opposite end of the connector is locked in place with a swivelled-in locking plate. The plate fits into compartments in the side wall of the associated pan. The plate carries a resilient pin at one end which fits into recesses in one of the compartments while the opposite end of the plate has a tongue which snaps into a recess in the base of the opposite compartment.

17 Claims, 3 Drawing Sheets

CONNECTIONS FOR INTER-CONNECTING THE PANS OF SCRAPER-CHAIN CONVEYORS

FIELD OF THE INVENTION

The present invention relates to scraper-chain conveyors for use in underground mining installations and, more particularly, to connections for joining the individual channel sections or pans of the conveyor together.

BACKGROUND OF THE INVENTION

It is known to use a variety of devices in order to connect the adjacent ends of the pans of a scraper-chain conveyor together. The connection devices should permit a certain limited degree of free angular mobility between the ends of the pans in horizontal and vertical senses while resisting tensile forces acting to separate the ends.

A device known as a 'dog-bone' connector has been widely adopted and such a connector is described in U.S. Pat. No. 4,733,771. This connector fits neatly into appropriately-shaped compartments or pockets at the end regions of the side walls of the pans to be joined together. The pockets are open and accessible from the exterior. To prevent the connector from falling out, the connector may have projections at the widened head ends, one projection engages into a rear recess closed from the outside in one of the pan side walls while the other projection is locked in place with a swivelled locking member. With the connector fitted, the pans are reliably held together in a traction-proof manner while some angular mobility is permitted to enable the conveyor to be shifted up progressively and to enable the conveyor to cope with uneven floors. Connectors of this type can also be used to connect together other mining equipment, such as machine guides, e.g. coal plough or shearer guides, which are constructed from lengths similar to the conveyor pans.

In U.S. Pat. No. 4,733,771 in order to secure the locking member in position, a clamping sleeve is driven into aligned bores in the member and in the walls of a compartment receiving the member. A major disadvantage of this arrangement is that the clamping sleeve is prone to become jammed into the bores by rust or dirt and the release of the sleeve can lead to difficulties.

An object of this invention is to provide an improved securing arrangement for the locking member.

SUMMARY OF THE INVENTION

In connection means constructed in accordance with the invention a locking member serves to engage over a projection of the dog-bone connector as known per se but the locking member has a resiliently deformable securing member projecting from at least one side thereof. Means defines at least one compartment in the pan side wall to receive the locking member and there is at least one recess in the compartment which receives the securing member.

In one constructional form, the locking member is a plate and the securing member can extend from the both sides of the plate. In this case the defining means may possess two recesses for the projecting parts of the member. One of these recesses can be a simple cut-out directed towards the connector. The plate can be orientated to bring the securing member into register with the recess or recesses and the plate swivelled about the securing member into a locked-in position. Preferably the end of the plate opposite the securing member slides over a guide surface in another compartment receiving this opposite end. The guide surface can terminate with a step leading to a recess and the plate may have a tongue which fits in this recess. In this arrangement as the plate is swung into the compartment with the stepped recess the securing member can urge the tongue into the stepped recess.

The securing member carried by the plate can be made from a hard natural or synthetic rubber. The resiliency of this component then provides a biasing force which holds the plate in the locked position.

The plate can be a simple strip of metal with a bore into which the securing member is fitted. The securing member may be a pin with reduced central region fitted in the bore and tapered end regions projecting from the plate. The cut-out and an inner recess which receives the projections of the pin can be formed by an insert welded between a rib extending along the pan and an upstanding wall portion. A similar insert can be used to create the other compartment. One compartment can be open in one direction facing the end of one pan while the other compartment is open in the opposite direction. This enables the plate to be twisted clockwise or anti-clockwise to enter the compartments. To facilitate the release of the locking plate it is preferable to provide the plate with an aperture accessible when the plate is locked-in. A simple tool can be engaged in the aperture to enable the plate to be swivelled and released.

The compartments are preferably so dimensioned as to permit some play of the plate sufficient to enable the securing member to be deformed to release the plate.

Conveniently the end of the plate with the deformable securing member is the upper end relative to the connection when in use.

The invention may be understood more readily, and various other aspects and features of the invention may become apparent, from consideration of the following description.

An embodiment of the invention will now be described, by way of example only, with reference to the accompanying drawings, wherein.

DESCRIPTION OF PREFERRED EMBODIMENT

The connection means described hereinafter is similar in many respects to that described in U.S. Pat. No. 4,733,771 the contents of which are incorporated herein by way of reference.

Figure 1:
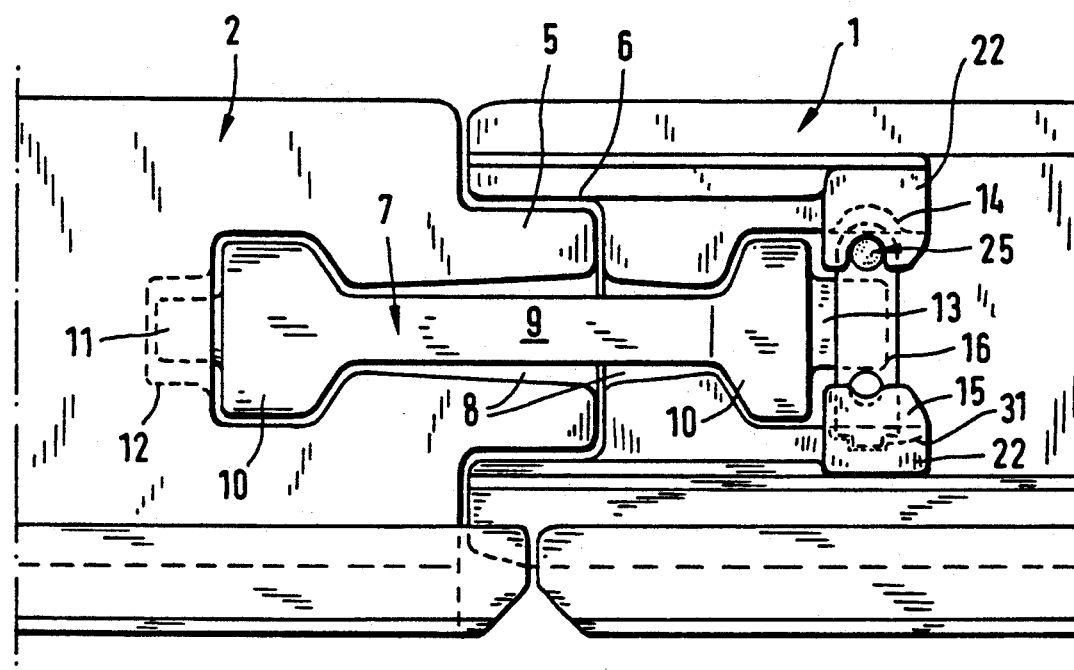
FIG. 1 is a schematic side view of the end zones of the side walls of two adjacent pans or channel sections of a scraper-chain conveyor employing connection means in accordance with the invention.
Figure 2:
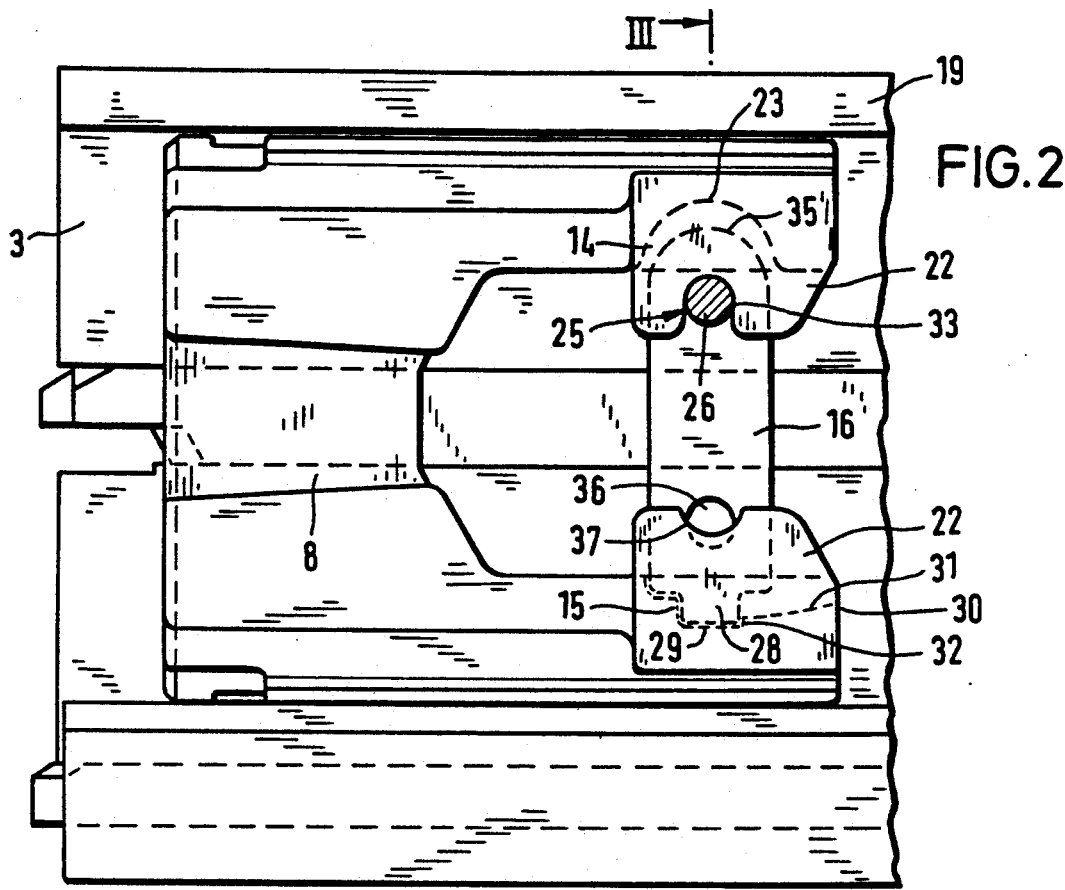
FIG. 2 is an enlarged view of part of the connector means and one of the side walls depicted in FIG. 1.
Figure 3:
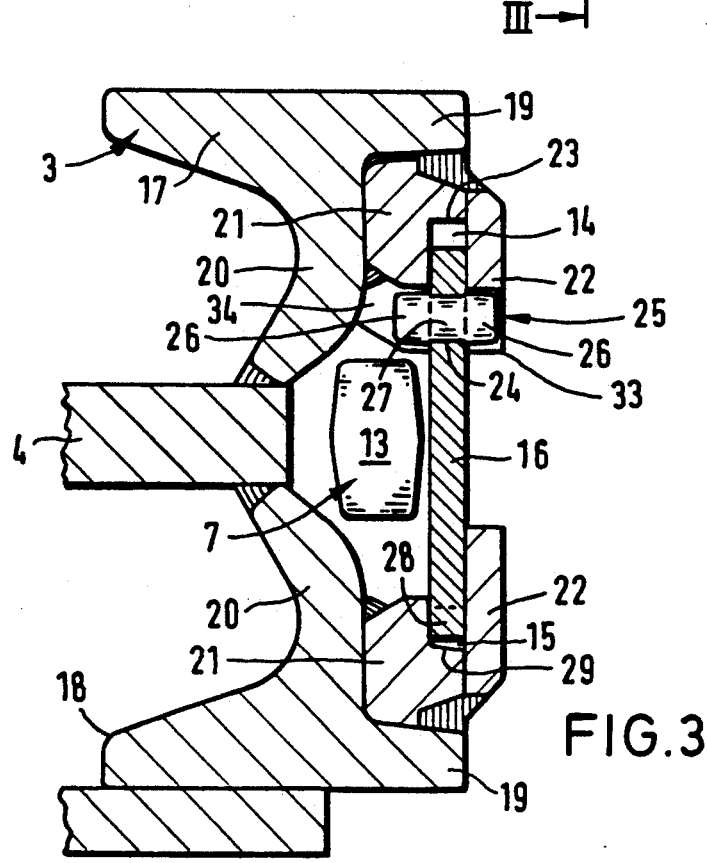
FIG. 3 is a sectional view taken along the line III—III of FIG. 2.
Figure 4:
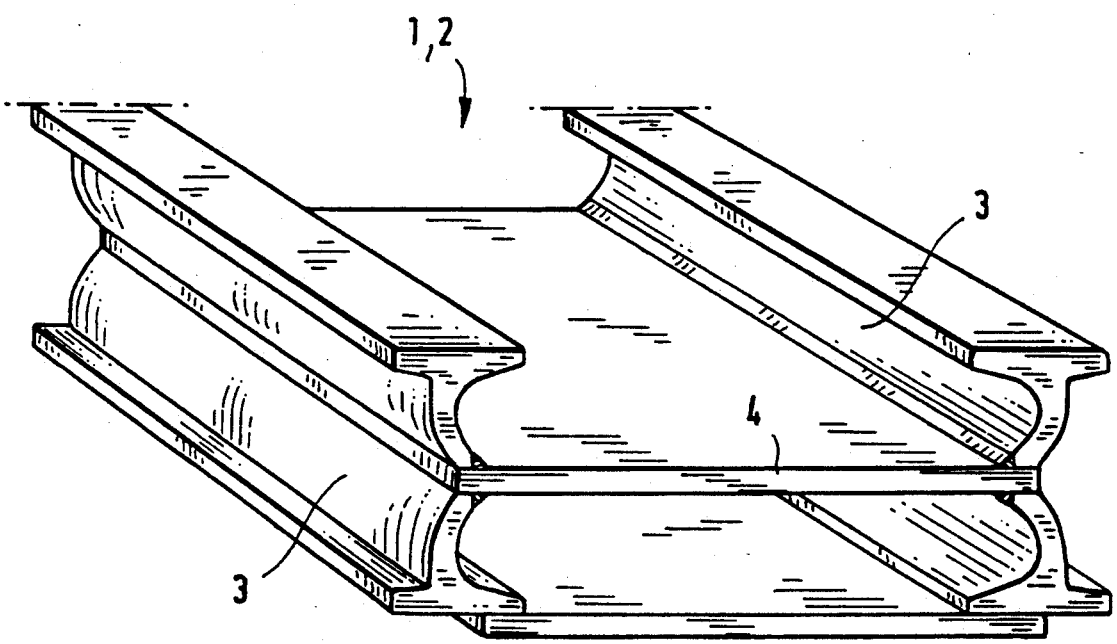
FIG. 4 is a perspective view of one of the conveyor pans.

As shown in FIG. 1 of the accompanying drawings, two adjacent channel sections or pans of a scraper-chain conveyor are designated by reference numerals 1, 2. As shown in FIG. 4, each of the pans has a pair of side walls 3 which are interconnected with a welded-in floor plate 4. The adjacent walls 3 of the pans 1, 2 which are to be connected together have an inter-engaging projection and recess 5, 6 producing a tenon joint with a certain degree of free angular mobility. The projection and recess 5, 6 can be formed by components welded onto the side walls 3 of the pans 1, 2 and more preferably into cut-out portions thereof. To preserve angular mobility of the end zones of the pans 1, 2 while resisting tensile force a 'dog-bone' type connector 7 is used to connect the pans 1, 2. This connector 7 is inserted laterally into shaped pockets 8 in the walls 3 of the pans 1, 2 or more preferably into reinforcement pieces welded to the walls 3. The connector 7 has a central shank 9 with enlarged heads 10 at its ends 9. Each head 10, has an axial projection 11, 13. The projection 11 engages in an aperture 12 in the associated pan side wall 3 closed off from the exterior as another tenon joint. The other projection 13 is detachably held in position with a locking member 16. As shown in FIGS. 2 and 3 the pocket 8 in the wall 3 associated with the projection 13 adjoins compartments 14, 15, which receive the locking member 16. The locking member 16 prevents withdrawal of the connector 7 by extending over the projection 13. As shown in FIG. 3, the side wall 3 is provided with ribs 19 extending outwardly in alignment with upper and lower flanges 17, 18. Inserts 21 are welded between the ribs 19 and the web-like wall portions 20 of the wall 3 which extend to the floor plate 4. The inserts 21 define the compartments 14, 15 for accommodating the locking member 16. A front wall 22 of the upper insert 21 has a concave cut-out 33 and an inner lateral base wall surface 23 of the compartment 14 is curved as shown in FIG. 2. The front wall 22 of the lower insert 21 also has a concave cut-out 37 and an inner lateral base wall surface of the compartment 15 is stepped with a recess 29 as also shown in FIG. 2. The compartment 14 is at least open at the side detected towards the opposite pan 2 whilst the compartment 15 is at least open at the opposite side to the compartment 14 thereby to enable the plate 16 to be swivelled - in clockwise and introduced or withdrawn in an anti-clockwise movement or vica-versa. The base surface of the compartment 15 has an extended region 31 which extends from the opening 30 of the compartment 15 to the recess 29 as a guide surface terminating at a step 32.

The member 16 is itself a simple narrow strip or plate of sheet metal which can be punched or stamped out. The plate 16 has a bore 24 at its upper curved end which receives a securing member 25 made of an elastically deformable material, such as hard rubber or synthetic plastics. The member 25 is located with a reduced diameter central portion 27 fitted within the bore 24 and end portions 26 which project outwardly from the side faces of the plate 16. The projections 26 are preferably slightly tapered, e.g. frusto-conical, as shown to facilitate fitting of the member 25 into the bore 24. The plate 16 has at its lower end a tongue 28 which fits into the recess 29 in the compartment 15. The upper insert 21 has a rear wall provided with a recess 34 opposite the cut-out 33 as shown in FIG. 3. As shown in FIG. 2 the plate 16 has an aperture 36 at its lower end region.

The plate 16 is shown in FIGS. 2 and 3 in its fitted position with the portions 26 of the member 25 engaging in the cut-out 33 and the recess 34 and the tongue 28 seated in the recess 29. The upper curved end 35 of the plate 16 is spaced from the corresponding curved inner base surface 23 of the compartment 14. The aperture 36 in the plate is partly covered over by the cut-out 37 in the wall 22 of the lower insert 21. The plate 16 is fitted after the connector 7 is installed in the pockets 8. This involves holding the plate 16 at an angle with the upper region at the left of the compartment 14 and the lower region at the right of the compartment 15 relative to FIG. 2 and bringing the upper region of the plate 16 into the compartment 14 from the open side to engage the member 25 in position in the cut-out 33 and the recess 34. The plate 16 can now be swivelled clockwise about the axis of the member 25 to bring the tongue 28 into the open side 30 of the compartment 15 and along the guide surface 31. The resiliency of the member 25 tends to urge the lower region of the plate 16 downwardly so that the tongue 28 tends to snap into the recess 29 once the step 32 is passed. The force exerted by the member 25 is sufficient to hold the tongue 28 in the recess 29.

To remove the plate 16 and permit release of the connector 7, a tool such as a simple bar is introduced into the aperture 36 and the plate 16 is raised slightly against the resilient force of the member 25 to release the tongue 28 from the recess 29 and the step 32. The plate 16 can then be swivelled anti-clockwise out from the compartment 15 and the tongue 28 again runs over the guide surface 31. When the lower region of the plate 16 passes out from the opening 30 at the side of the compartment 15 the plate 16 can be drawn downwards from the compartment 14.

Various modifications of the construction as described can be made. For example, the member 25 need not project from both sides of the plate 16, instead it can project on only one side. The plate 16 need not be installed and removed as described. Instead the lower end of the plate 16 can be move along the guide surface 31 and the tongue 28 fitted into the recess 29 first and then the plate 16 swung clockwise to bring the upper region into position with the member 25 adopting the locking position with a snap-in action. The position of the member 25 can also be reversed so that the lower end region of the plate 16 carries this member 25. Indeed the whole arrangement can be inverted with the compartment 15 at the top and the compartment 14 at the bottom and the plate 16 inverted accordingly. The illustrated embodiment and mode of operation is preferred since the cut-out 33 and the recess 34 can be sized independent of the elastic deformation of the member 25. The member 25 can then be made of comparatively hard material since the required amount of deformation is only slight. This prolongs the life of the member 25.

The connection means can be transposed through 180° with the locking member 16 used to secure the projection 11 instead of the projection 13.

We claim:

1. In connection means for connecting together two adjacent channel sections of a scraper-chain conveyor, the channel-sections each comprising a pair of side walls and a floor plate therebetween, the connection means comprising a connector with a central shank and enlarged heads at opposite ends of the shank, laterally-open pockets in end regions of the side walls of the adjacent channel sections shaped to receive the connector, a projection provided on at least one of the heads extending outwardly from said head relative to the shank and releasable locking means for engaging over the projection to secure the connector in position; wherein the locking means includes a separate releasable plate located to project over the projection and a resiliently deformable securing member carried by the plate and extending outwardly from at least one side of the plate, means defining a compartment in the side wall of one of the channel sections for receiving and end portion of the plate and means defining at least one recess for receiving the securing member.

2. Connection means accordingly to claim 1, wherein there are two compartments one of which receives one end of the plate and the other of which receives the other end of the plate and has the recess for receiving the securing member.

3. Connection means according to claim 2 wherein said at least one recess is a cut-out in a wall of the other compartment which is open towards the connector.

4. Connection means according to claim 2 wherein the one compartment has a guide surface for guiding the one end of the plate into the one compartment as the plate is swivelled.

5. Connection means according to claim 2, wherein the one end of the plate has an outwardly projecting tongue and the one compartment has a stepped recess for receiving the tongue of the one end of the plate.

6. Connection means according to claim 4 wherein the guide surface terminates with a step adjacent a recess and the plate has a tongue at the one end for engaging in the recess.

7. Connection means according to claim 1 wherein the securing member projects from both sides of the plate and there are respective recesses in the defining means for receiving both projections of the securing member.

8. Connection means according to claim 7 wherein the securing member is a pin fitted into a hole in the plate.

9. Connection means according to claim 8 wherein the pin has a reduced region engaged in the hole and end projections of the pin which are tapered.

10. Connection means according to claim 1 wherein the plate has an aperture which receives a tool usable to position or release the plate.

11. Connection means according to claim 2, wherein the compartments are defined by inserts welded between ribs extending along the side wall of said one channel section and web portions of the side wall.

12. Connection means according to claim 2 wherein the other end of the plate has a curved exterior surface and the other compartment has a corresponding inner curved surface.

13. Connection means according to claim 2, wherein the other compartment is above the one compartment.

14. In connection means for connecting together two adjacent channel sections of a scraper-chain conveyor, the channel-sections each comprising a pair of side walls and a floor plate therebetween, the connection means comprising a connector with a central shank and enlarged heads at opposite ends of the shank, laterally-open pockets in end regions of the side walls of the adjacent channel sections shaped to receive the connector, a projection provided on at least one of the heads and releasable locking means for engaging over the projection to secure the connector in position; wherein the locking means includes a plate with a resiliently deformable securing member extending outwardly from at least one side of the plate, means defining compartments in the side wall of one of the channel sections for receiving respective end portions of the plate and at least one recess adjoining one of the components for receiving the securing member wherein one of the compartments has a guide surface for guiding an associated one end of the plate into the one compartment as the plate is swivelled.

15. In connection means for connecting together two adjacent channel sections of a scraper-chain conveyor, the channel-sections each comprising a pair of side walls and a floor plate therebetween, the connection means comprising a connector with a central shank and enlarged heads at opposite ends of the shank, laterally-open pockets in end regions of the side walls of the adjacent channel sections shaped to receive the connector, a projection provided on at least one of the heads and releasable locking means for engaging over the projection to secure the connector in position; wherein the locking means includes a plate with a resiliently deformable securing member extending outwardly from at least one side of the plate, means defining compartments in the side wall of one of the channel sections for receiving respective end portions of the plate and at least one recess adjoining one of the components for receiving the securing member wherein one end of the plate has an outwardly projecting tongue and the compartment associated with said one end has a stepped recess for receiving the tongue at the one end of the plate.

16. In connection means for connecting together two adjacent channel sections of a scraper-chain conveyor, the channel-sections each comprising a pair of side walls and a floor plate therebetween, the connection means comprising a connector with a central shank and enlarged heads at opposite ends of the shank, laterally-open pockets in end regions of the side walls of the adjacent channel sections shaped to receive the connector, a projection provided on at least one of the heads and releasable locking means for engaging over the projection to secure the connector in position; wherein the locking means includes a plate with a resiliently deformable securing member extending outwardly from both sides of the plate, means defining compartments in the side wall of one of the channel sections for receiving respective end portions of the plate and recesses in the defining means for receiving both projections of the securing member.

17. In connection means for connecting together two adjacent channel sections of a scraper-chain conveyor, the channel-sections each comprising a pair of side walls and a floor plate therebetween, the connection means comprising a connector with a central shank and enlarged heads at opposite ends of the shank, laterally-open pockets in end regions of the side walls of the adjacent channel sections shaped to receive the connector, a projection provided on at least one of the heads and releasable locking means for engaging over the projection to secure the connector in position; wherein the locking means includes a plate with a resiliently deformable securing member extending outwardly from at least one side of the plate, means defining compartments in the side wall of one of the channel sections for receiving respective end portions of the plate and at least one recess adjoining one of the components for receiving the securing member wherein the plate has an aperture which receives a tool usable to position or release the plate.

* * * * *